(12) United States Patent
Chang et al.

(10) Patent No.: US 7,366,817 B2
(45) Date of Patent: Apr. 29, 2008

(54) FRAME ORDER PROCESSING APPARATUS, SYSTEMS, AND METHODS

(75) Inventors: Nai-chih Chang, Shrewsbury, MA (US); Pak-lung Seto, Shrewsbury, MA (US); Victor Lau, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 11/171,959

(22) Filed: Jun. 29, 2005

(65) Prior Publication Data

US 2007/0005832 A1 Jan. 4, 2007

(51) Int. Cl.
G06F 13/36 (2006.01)
(52) U.S. Cl. .................... 710/310; 710/30; 710/52; 370/394
(58) Field of Classification Search ......... 710/307, 710/310, 316; 370/389, 394, 398; 702/185
See application file for complete search history.

(56) References Cited

U.S. PATENT DOCUMENTS

| | | | |
|---|---|---|---|
| 6,259,699 B1 * | 7/2001 | Opalka et al. | 370/398 |
| 6,359,883 B1 * | 3/2002 | Lechleider | 370/389 |
| 6,839,794 B1 * | 1/2005 | Schober | 710/316 |
| 7,197,591 B2 * | 3/2007 | Kwa et al. | 710/307 |
| 2003/0214949 A1 * | 11/2003 | Shaikli | 370/394 |
| 2004/0083077 A1 * | 4/2004 | Baumer et al. | 702/185 |
| 2006/0031612 A1 | 2/2006 | Bashford et al. | |
| 2006/0039405 A1 | 2/2006 | Day et al. | |
| 2007/0005810 A1 | 1/2007 | Halleck et al. | |

FOREIGN PATENT DOCUMENTS

WO WO-2007002922 A1 1/2007

OTHER PUBLICATIONS

"American National Standard for Information Technology—Serial Attached SCSI (SAS)", *American National Standard*, 376, (Nov. 11, 2003).

* cited by examiner

*Primary Examiner*—Christopher E. Lee
(74) *Attorney, Agent, or Firm*—Schwegman, Lundberg & Woessner, P.A.

(57) ABSTRACT

Apparatus and systems, as well as methods and articles, may bridge between a link layer and a transport layer in a multi-lane serial-attached small computer system interface (SCSI)-serial SCSI protocol (SAS-SSP) device. A lane number first-in first-out buffer (FIFO) array may operate to order frame processing such that frames associated with an input-output (IO) stream subset of a plurality of SAS-SSP frames received at a plurality of lane receive buffers are processed in an IO stream subset order.

28 Claims, 3 Drawing Sheets

FRAME ORDER PROCESSING APPARATUS, SYSTEMS, AND METHODS

TECHNICAL FIELD

Various embodiments described herein relate to digital communications generally, including apparatus, systems, and methods used to process frames using a connection oriented protocol.

BACKGROUND INFORMATION

A serial-attached small computer system interface (SCSI)-serial SCSI protocol (SAS-SSP) host bus adapter (HBA) device may communicate with target devices (e.g., disk drives) in a wide port configuration. The wide port may comprise a plurality of physical interface pairs, one interface of a pair at the HBA and another interface at the target device. A frame path between the HBA and the target device may include the interfaces, and may be referred to as a "lane." Frames associated with a given input-output ("IO") or SCSI initiator-target-logical unit-queue ("ITLQ") may be transmitted in a sequence referred to herein as an "IO stream subset order."

A SAS protocol specification permits transmission of integral frames on different lanes. A SAS end device may initiate lane switching for efficiency of lane utilization in a SAS wide port configuration. A lane switch may occur, for example, when ACK/NAK sequences become balanced on a lane originally associated with an IO. According to the SAS standard, there are two types of frames, interlock frames and non-interlock frames. In the case of interlock frames, a transmitter may wait for acknowledgements before sending another frame. In contrast, the transmitter may send additional non-interlock frames before receiving acknowledgements to outstanding frames. ACK/NAK sequences may be balanced when a total number of received ACK/NAKs is equal to the total number of transmitted frames. For additional information regarding SAS-SSP, please see Working Draft Project American National Standard T10, Information Technology—Serial Attached SCSI (SAS) Version 1.1 Revision 09d (30 May 2005).

An earlier received frame associated with an IO may become stalled in a first receive buffer. Meanwhile, a later-received, lane-switched frame associated with the IO may appear at a head of a second receive buffer, ready for processing by a protocol processor associated with the second lane. The second-lane protocol processor may determine whether frames such as the earlier received frame associated with the IO are buffered on the stalled lane. This condition may result in complicated IO tag searching among lanes comprising the wide port, including perhaps cross-communications between the lanes.

Another potential complication is that two frames associated with the same IO may appear at the head of multiple receive buffers at the same time. Determining which frame should be processed first may be difficult, especially in the case of a large number of lanes within a SAS wide port.

DETAILED DESCRIPTION

Figure 1:
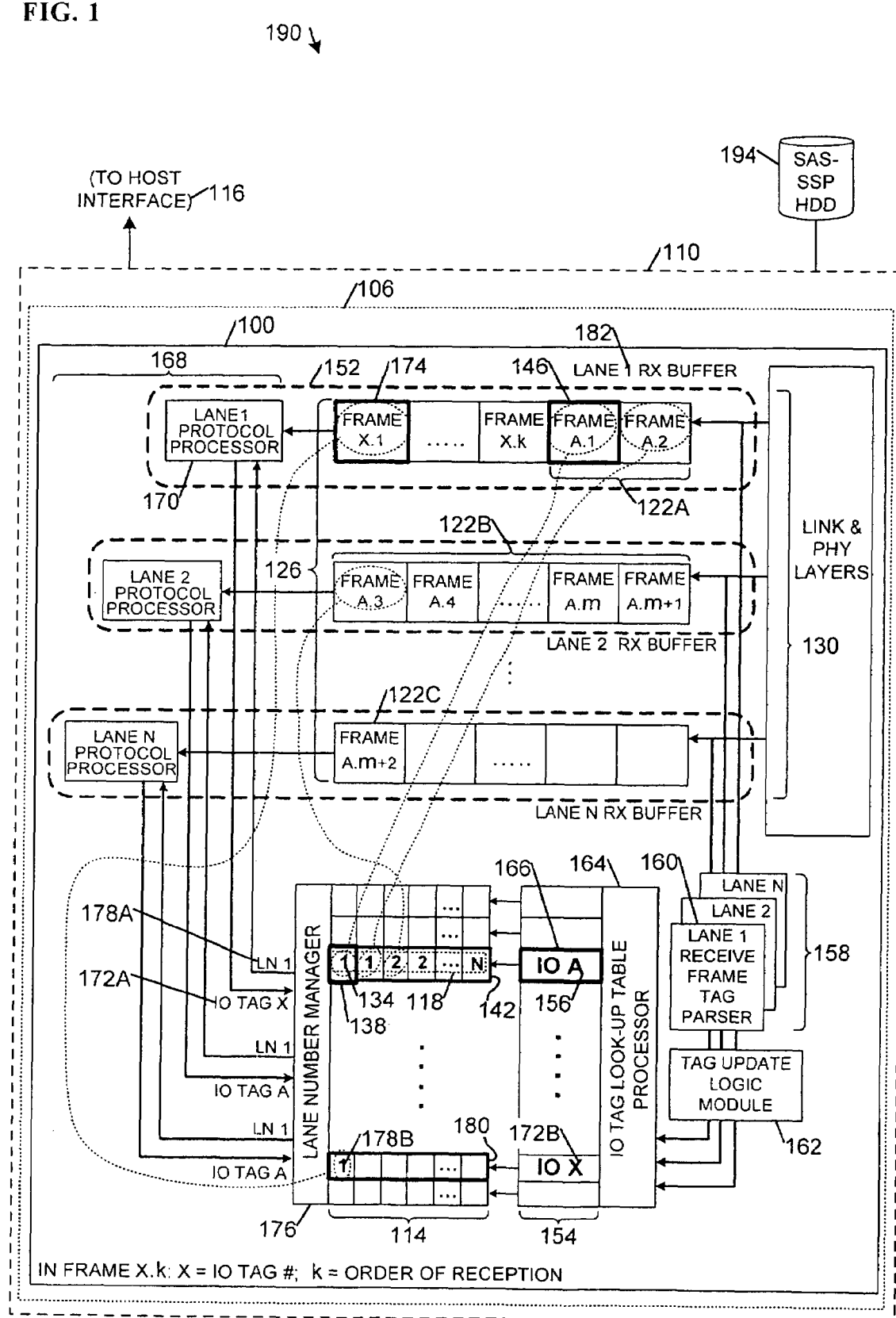
FIG. 1 is a block diagram of an apparatus and a representative system according to various embodiments of the invention.

FIG. 1 comprises a block diagram of an apparatus 100 and a system 190 according to various embodiments of the invention. For purposes of an example, assume that frames identified as "A.3" and "A.m+2" are associated with a particular IO. The letter "A" may represent a unique IO tag, perhaps resulting from the concatenation of a remote node identification index (RNI) and an ITLQ tag field. Some embodiments may comprise other IO tag definitions. A unique SAS address may be associated with each remote node in a SAS domain. According to the SAS standard, the tag field may contain a value that allows an SSP end device port to refer to a context for commands and task management functions. The number 3 of the frame A.3 may represent an order of reception of the frame A.3. In the example, frames A.3 and A.m+2 both appeared at the head of their respective buffers in lane 2 and lane N, and are thus ready for protocol processing. To maintain a received data order within an IO, frame A.3 must be processed before frame A.m+2.

In another example, assume that frames A.1, A.2 are stored in a lane 1 receive buffer, frames A.3 to A.m+1 in a lane 2 buffer, and frame A.m+2 in a lane N buffer in a wide port configuration as shown in FIG. 1. When a frame appears at the head of a receive buffer, the protocol processor uses an IO tag parsed from the frame as an index to obtain a lane number from the head of a lane number FIFO. The lane number may correspond to a receive buffer where the frame is stored. The lane number FIFO may correspond to a sequence of frames identified by the IO tag. The sequence of frames may be stored in various buffers. In FIG. 1, frame X.1 appears at the head of the lane 1 receive buffer, for example, and is ready to be processed. The lane 1 protocol processor uses IO tag X to index the lane identifier "1" from the lane number FIFO. The identifier so indexed identifies the lane number associated with receive buffer 1 wherein the frame is stored; therefore frame X.1 is allowed to be processed.

Likewise, the appearance of frame A.3 at the head of a lane 2 receive buffer triggers a lane number lookup from the lane number FIFO. In this case, however, the lane identifier "1" indexed from the lane number FIFO does not identify lane 2 wherein frame A.3 is stored. Frame A.3 is therefore not processed, and must wait until a lane number FIFO look-up returns a lane identifier "2." Frame A.m+2 appears at the head of a receive buffer corresponding to lane N, and indexes lane identifier "1" from the lane number FIFO. Since the identifier "1" does not identify lane number N where the frame A.m+2 is stored, this frame too must wait to be processed. After completing frame processing operations for a frame in a given buffer, the lane number indexed by the IO tag in the buffer is popped from the lane number FIFO to enable gating of the next ordered frame for protocol processing. Embodiments described herein may thus enforce the processing of frames associated with a particular IO stream in an order of reception of the frames.

The apparatus 100 may be contained within a hardware protocol engine 106 associated with a SAS-SSP device 110, and may include a lane number FIFO array 114 in the SAS-SSP device 110. The device 110 may be coupled to a host interface 116. The lane number FIFO array 114 may be organized into a plurality of FIFOs, each FIFO comprising a row of array 114 to store a sequence of lane numbers 118 associated with a particular IO. (See, e.g., first FIFO 142.) The sequence 118 may represent an input-output (IO) stream subset 122A, 122B, 122C of a plurality of SAS-SSP frames 126 received at a plurality of lane receive buffers 130. A first lane number 134 stored at a first position 138 within the first FIFO 142 may be associated with a first frame 146 from the IO stream subset 122A stored in a first lane receive buffer 152, the first lane receive buffer 152 corresponding to the first lane number 134.

The apparatus 100 may also include an IO tag look-up table (LUT) 154 coupled to the FIFO array 114 to store a first IO tag 156 associated with the IO stream subset 122A, 122B, 122C. The LUT 154 may index the first FIFO 142 from the FIFO array 114 using the first IO tag 156. The LUT 154 may be sized with a number of locations sufficient to support a desired number of active outstanding IOs.

The apparatus 100 may further include a plurality of receive frame tag parser modules 158 coupled to the LUT 154. The parser modules 158 may be associated with the plurality of lane receive buffers 130. A first parser module 160 associated with the first lane receive buffer 152 may operate to extract an ITLQ nexus tag from a header associated with the first frame 146. The first parser module 160 may concatenate the ITLQ tag with an RNI received from a connection management unit to form the first IO tag 156 (e.g., IO A). Thus, IO tags associated with frames from the IO stream subset 122A, 122B, 122C (e.g., IO A) maybe identical to each other.

The apparatus 100 may also include an IO tag update logic module 162 to receive the first IO tag 156 from the first parser module 160. An IO tag LUT processor 164 may be coupled between the IO tag update logic module 162 and the IO tag LUT 154. The processor 164 may query the LUT 154 for the first IO tag 156 upon receipt of the first IO tag 156 from the IO tag update logic module 162. The processor 164 may write the first IO tag 156 into an available LUT location 166 if the query finds that the LUT 154 does not contain the first IO tag 156. The processor 164 may also push the first lane number 134 corresponding to the first frame 146 into the first FIFO 142 corresponding to the first IO tag 156.

The apparatus 100 may further include a plurality of lane protocol processors 168 coupled to the lane number FIFO array 114. The protocol processors 168 may exist in association with the plurality of lane receive buffers 130. A first lane protocol processor 170 may provide a second IO tag 172A to the FIFO array 114, perhaps via a lane number manager 176 coupled to the FIFO array 114. The second IO tag 172A may be associated with a second frame 174 appearing at the head of a lane receive buffer (e.g., the first lane receive buffer 152) associated with the first lane protocol processor 170.

The lane number manager 176 may operate to return a second lane number 178A, 178B indexed from a second lane number FIFO 180 using the second IO tag 172A. The first lane protocol processor 170 may process the second frame 174 if the second lane number 178A, 178B indexed from the FIFO array 114 using the second IO tag 172A, 172B matches a lane number 182 corresponding to the lane receive buffer. The lane number manager 176 may also operate to pop the second lane number 178B from the second FIFO 180 after the first lane protocol processor 170 completes processing of the second frame 174.

In another embodiment, a system 190 may comprise one or more of the apparatus 100, including a lane number FIFO array 114 in a SAS-SSP device 110, an IO tag LUT 154, an IO tag LUT processor 164, receive frame tag parser modules 158, lane protocol processors 168, and a lane number manager 176, as previously described. The system 190 may also include a disk drive 194 coupled to the device 110 to transmit the first frame 146.

Any of the components previously described can be implemented in a number of ways, including embodiments in software. Thus, the apparatus 100; hardware protocol engine 106; device 110; lane number FIFO array 114; host interface 116; lane numbers 118, 134, 178A, 178B, 182; IO stream subset 122A, 122B, 122C; frames 126, 146, 174; lane receive buffers 130, 152; position 138; FIFOs 142, 180; IO tag look-up table (LUT) 154; IO tags 156, 172A, 172B; parser modules 158, 160; IO tag update logic module 162; IO tag LUT processor 164; LUT location 166; lane protocol processors 168, 170; lane number manager 176; system 190; and disk drive(s) 194 may all be characterized as "modules" herein.

The modules may include hardware circuitry, single or multi-processor circuits, memory circuits, software program modules and objects, firmware, and combinations thereof, as desired by the architect of the apparatus 100 and system 190 and as appropriate for particular implementations of various embodiments.

The apparatus and systems of various embodiments can be used in applications other than ordering SAS-SSP IO frame processing using a lane number FIFO array in an SAS-SSP device hardware protocol engine. The illustrations of apparatus 100 and system 190 are intended to provide a general understanding of the structure of various embodiments, and they are not intended to serve as a complete description of all the elements and features of apparatus and systems that might make use of the structures described herein.

Applications that may comprise the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Embodiments herein may be included as sub-components within a variety of electronic systems, such as televisions, cellular telephones, personal computers, workstations, radios, video players, vehicles, and others. Some embodiments may include a number of methods.

Figure 2:
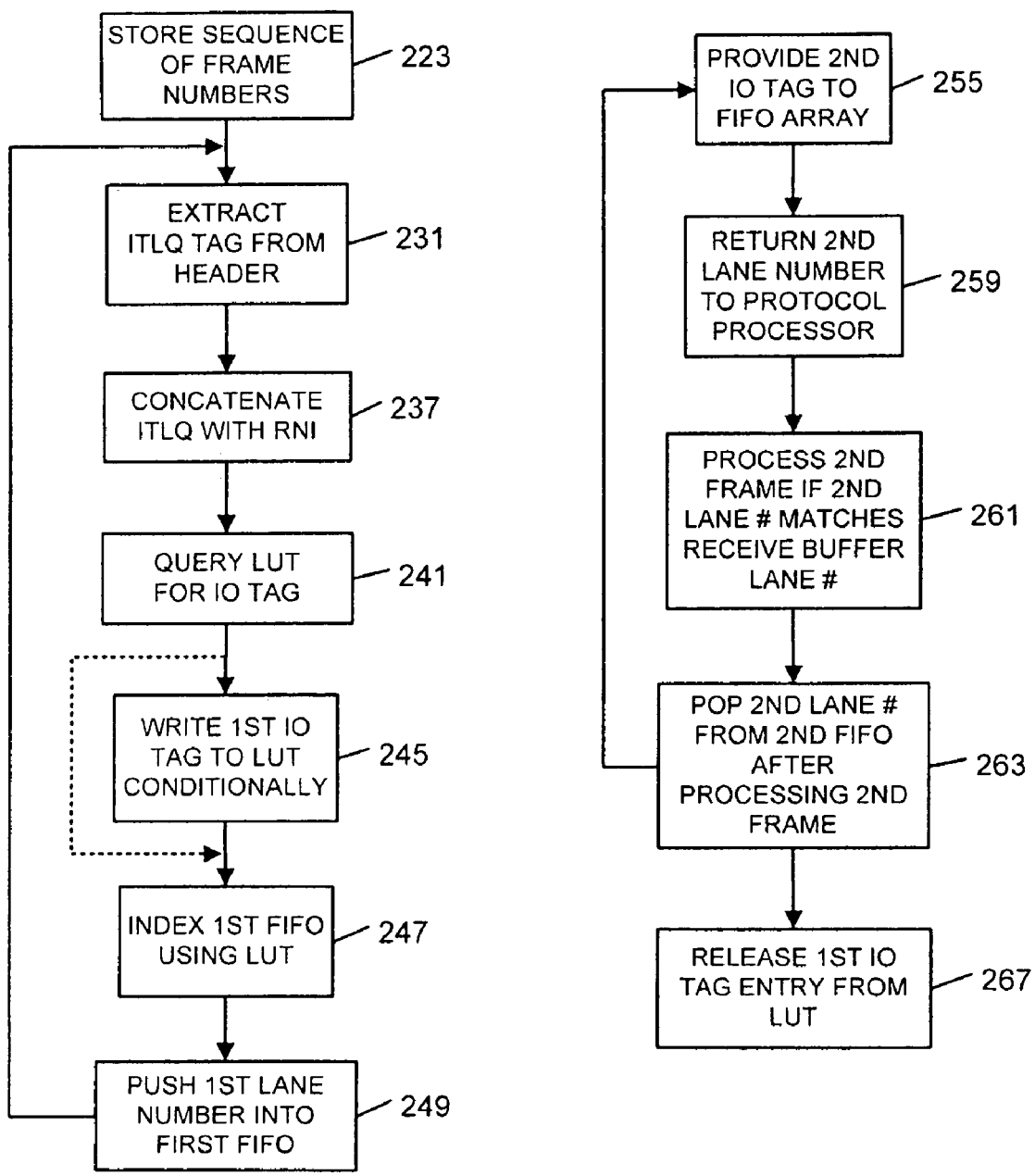
FIG. 2 is a flow diagram illustrating several methods according to various embodiments of the invention.

FIG. 2 is a flow diagram illustrating several methods according to various embodiments of the invention. One such method 211 may use a lane number FIFO array parallel to a plurality of lane receive buffers to bridge between a link layer and a transport layer in a multi-lane SAS-SSP device. The SAS-SSP device may conform to a set of standards incorporated into Working Draft, American National Standard Project T10, Information Technology—Serial Attached SCSI (SAS) Revision 9d (30 May 2005).

The method 211 may use the lane number FIFO array to order frame processing. Ordering may occur such that frames associated with an IO stream subset of a plurality of SAS-SSP frames received at the plurality of lane receive buffers are processed in an IO stream subset order. The IO stream subset order may correspond to an order of reception of the frames at the SAS-SSP device.

The method 211 may begin at block 223 with storing a sequence of lane numbers in the lane number FIFO array, the array organized into a plurality of FIFOs. The sequence of lane numbers may be representative of the IO stream subset of frames received at the plurality of lane receive buffers. That is, a first lane number stored at a first position within a first FIFO may be associated with a first frame from the IO stream subset stored in a first lane receive buffer corresponding to the first lane number.

The method 211 may continue at block 231 with extracting an ITLQ nexus tag from a header associated with the first frame using a first frame tag parser module associated with the first lane receive buffer. The first frame tag parser module may comprise one of a plurality of frame tag parser modules associated with the plurality of lane receive buffers. The method 211 may also include concatenating the ITLQ tag with an RNI received from a connection management unit to form a first IO tag, at block 237.

The method 211 may also include querying a LUT for the first IO tag upon receipt of the first IO tag from an IO tag update logic module using an IO tag LUT processor coupled to the IO tag LUT, at block 241. The method 211 may further include writing the first IO tag into an available LUT location if the query finds that the LUT does not contain the first IO tag, at block 245. If the query finds that the LUT contains the first IO tag, the method 211 may proceed directly from block 241 to block 247. The method 211 may include indexing the first FIFO from the lane number FIFO array using the first IO tag and the LUT, at block 247. That is, an IO tag value in the LUT may serve as an index to point to a particular FIFO in the array.

The method 211 may also include pushing the first lane number corresponding to the first frame into the first FIFO corresponding to the first IO tag, at block 249. Repeating blocks 231 through 249 may operate to fill a FIFO corresponding to an IO tag with a sequence of lane numbers. Each lane number in the sequence may correspond to a frame in the IO identified by the IO tag. An order of the lane numbers in the sequence may correspond to a desired order of processing of the frames from the identified IO stored in various receive buffers.

The method 211 may also begin at block 255 with providing a second IO tag to the FIFO array, the second IO tag parsed from a second frame appearing at the head of a lane receive buffer. A protocol processor associated with the lane receive buffer may be used to perform this activity. The method 211 may include returning a second lane number indexed from a second FIFO to the protocol processor, at block 259. A lane number manager coupled to the lane number FIFO array may be used to perform the index operation using the second IO tag as an index.

The method 211 may also include processing the second frame if the second lane number indexed from the lane number FIFO array using the second IO tag matches a lane number corresponding to the lane receive buffer, at block 261. The method 211 may also include popping the second lane number from the second FIFO after the protocol processor completes processing of the second frame, at block 263. The method 211 may return to block 255 from block 263 if the second FIFO is not empty. The method 211 may conclude at block 267 with releasing the first IO tag entry in the LUT by marking a corresponding LUT position as invalid when the first FIFO becomes empty.

It may be possible to execute the activities described herein in an order other than the order described. And, various activities described with respect to the methods identified herein can be executed in repetitive, serial, or parallel fashion. Information including parameters, commands, operands, and other data can be sent and received over wired or wireless paths.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
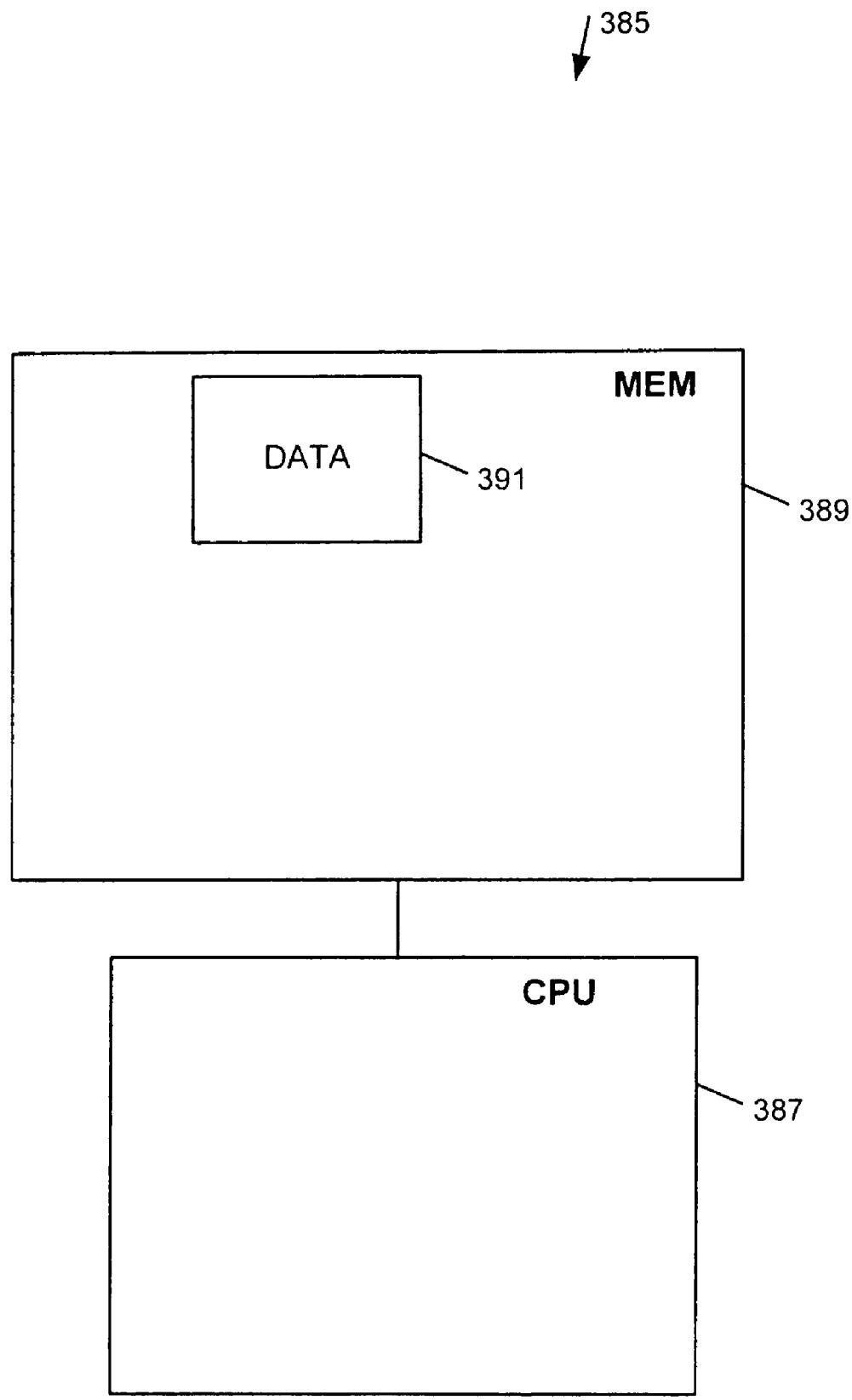
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) bridging between a link layer and a transport layer in a multi-lane SAS-SSP device using a lane number FIFO array, as previously described.

Implementing the apparatus, systems, and methods disclosed herein may thus operate to order SAS-SSP IO receive frame processing in a SAS-SSP device hardware protocol engine using a lane number FIFO array such that frames associated with an IO stream subset of a plurality of SAS-SSP frames received at a plurality of lane receive buffers are processed in an IO stream subset order.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
   a lane number first-in first-out buffer (FIFO) array in a serial-attached small computer system interface (SCSI)-serial SCSI protocol (SAS-SSP) device, the FIFO array organized into a plurality of FIFOs, each FIFO to store a sequence of lane numbers, the sequence representative of an input-output (IO) stream subset of a plurality of SAS-SSP frames received at a plurality of lane receive buffers, wherein a first lane number stored at a first position within a first FIFO is associated with a first frame from the IO stream subset stored in a first lane receive buffer corresponding to the first lane number; and
   an IO tag look-up table (LUT) coupled to the FIFO array to store a first IO tag associated with the IO stream subset and to index the first FIFO from the FIFO array using the first IO tag.

2. The apparatus of claim 1, wherein IO tags associated with frames from the IO stream subset are identical to each other.

3. The apparatus of claim 1, further including:
   a plurality of receive frame tag parser modules coupled to the LUT, a first parser module associated with the first lane receive buffer to extract an initiator-target-logical unit-queue (ITLQ) nexus tag from a header associated with the first frame, the first parser module to also optionally concatenate the ITLQ tag with a remote node identification index (RNI) received from a connection management unit to form the first IO tag.

4. The apparatus of claim 3, further including:
   an IO tag update logic module to receive the first IO tag from the first parser module.

5. The apparatus of claim 4, further including:
   an IO tag LUT processor coupled to the IO tag LUT to query the LUT for the first IO tag upon receipt of the first IO tag from the IO tag update logic module, to write the first IO tag into an available LUT location if the query finds that the LUT does not contain the first IO tag, and to push the first lane number corresponding to the first frame into the first FIFO corresponding to the first IO tag.

6. The apparatus of claim 5, further including:
   a plurality of lane protocol processors coupled to the lane number FIFO array, the protocol processors in association with the plurality of lane receive buffers, a first lane protocol processor to provide a second IO tag to the FIFO array, the second IO tag associated with a second frame appearing at the head of a lane receive buffer associated with the first lane protocol processor, the first lane protocol processor to process the second frame if a second lane number indexed from the FIFO array using the second IO tag matches a lane number corresponding to the lane receive buffer associated with the first lane protocol processor.

7. The apparatus of claim 6, further including:
   a lane number manager coupled to the FIFO array to return the second lane number indexed from a second FIFO using the second IO tag and to pop the second lane number from the second FIFO after the first lane protocol processor completes processing of the second frame.

8. A system, including:
   a lane number first-in first-out buffer (FIFO) array in a serial-attached small computer system interface (SCSI)-serial SCSI protocol (SAS-SSP) device, the FIFO array organized into a plurality of FIFOs, each FIFO to store a sequence of lane numbers, the sequence representative of an input-output (IO) stream subset of a plurality of SAS-SSP frames received at a plurality of lane receive buffers, wherein a first lane number stored at a first position within a first FIFO is associated with a first frame from the IO stream subset stored in a first lane receive buffer corresponding to the first lane number;
   an IO tag look-up table (LUT) coupled to the FIFO array to store a first IO tag associated with the IO stream subset and to index the first FIFO from the FIFO array using the first IO tag; and
   a disk drive coupled to the SAS-SSP device to transmit the first frame.

9. The system of claim 8, further including:
   an IO tag LUT processor coupled to the LUT; and
   a plurality of receive frame tag parser modules coupled to the IO tag LUT processor.

10. The system of claim 8, further including:
    a lane number manager coupled to the FIFO array; and
    a plurality of lane protocol processors coupled to the lane number manager.

11. A method, including:
    bridging between a link layer and a transport layer in a multi-lane serial-attached small computer system interface (SCSI)-serial SCSI protocol (SAS-SSP) device using a lane number first-in first-out buffer (FIFO) array such that frames associated with an input-output (IO) stream subset of a plurality of SAS-SSP frames received at a plurality of lane receive buffers are processed in an IO stream subset order.

12. The method of claim 11, further including:
    storing a sequence of lane numbers in the lane number FIFO array, the FIFO array organized into a plurality of FIFOs, the sequence of lane numbers representative of the IO stream subset of frames received at the plurality of lane receive buffers, wherein a first lane number stored at a first position within a first FIFO is associated with a first frame from IO stream subset stored in a first lane receive buffer corresponding to the first lane number.

13. The method of claim 12, further including:
    extracting an initiator-target-logical unit-queue (ITLQ) nexus tag from a header associated with the first frame using a first frame tag parser module associated with the first lane receive buffer, the first frame tag parser module comprising one of a plurality of frame tag parser modules associated with the plurality of lane receive buffers.

14. The method of claim 13, further including:
    concatenating the ITLQ tag with a remote node identification index (RNI) received from a connection management unit to form a first IO tag.

15. The method of claim 14, further including:
querying an IO tag look-up table (LUT) for the first IO tag upon receipt of the first IO tag from an IO tag update logic module using an IO tag LUT processor coupled to the IO tag LUT; and
writing the first IO tag into an available LUT location if the query finds that the LUT does not contain the first IO tag.

16. The method of claim 15, further including:
indexing the first FIFO from the FIFO array using the first IO tag and the LUT.

17. The method of claim 16, further including:
pushing the first lane number corresponding to the first frame into the first FIFO corresponding to the first IO tag.

18. The method of claim 17, further including:
releasing the first IO tag entry in the LUT by marking a corresponding LUT position as invalid when the first FIFO becomes empty.

19. The method of claim 11, further including:
providing a second IO tag to the FIFO array, the second IO tag parsed from a second frame appearing at the head of a lane receive buffer using a protocol processor associated with the lane receive buffer.

20. The method of claim 19, further including:
returning a second lane number indexed from a second FIFO using a lane number manager coupled to the FIFO array to perform the index operation using the second IO tag as an index.

21. The method of claim 20, further including:
processing the second frame if the second lane number indexed from the FIFO array using the second IO tag matches a lane number corresponding to the lane receive buffer.

22. The method of claim 21, further including:
popping the second lane number from the second FIFO after the protocol processor completes processing of the second frame.

23. An article including a machine-accessible medium having associated information, wherein the information, when accessed, results in a machine performing: bridging between a link layer and a transport layer in a multi-lane serial-attached small computer system interface (SCSI)-serial SCSI protocol (SAS-SSP) device using a lane number first-in first-out buffer (FIFO) array such that frames associated with an input-output (IO) stream subset of a plurality of SAS-SSP frames received at a plurality of lane receive buffers are processed in an IO stream subset order.

24. The article of claim 23, wherein the IO stream subset order corresponds to an order of reception of the frames at the SAS-SSP device.

25. The article of claim 23, wherein the SAS-SSP device conforms to a set of standards incorporated into Working Draft, American National Standard Project T10, Information Technology—Serial Attached SCSI (SAS) Revision 9d (30 May 2003).

26. An apparatus, including:
a first-in first-out buffer (FIFO) array organized into a plurality of FIFOs, each FIFO to store a sequence of lane numbers, the sequence representative of an input-output (IO) stream subset of a plurality of frames received at a plurality of lane receive buffers, wherein a first lane number stored at a first position within a first FIFO is associated with a first frame from the IO stream subset stored in a first lane receive buffer corresponding to the first lane number; and
a look-up table (LUT) coupled to the FIFO array to store a first IO tag associated with the IO stream subset and to index the first FIFO from the FIFO array using the first IO tag.

27. The apparatus of claim 26, wherein the FIFO array comprises a lane number FIFO array in a serial-attached small computer system interface (SCSI-serial SCSI protocol (SAS-SSP) device, wherein the plurality of frames comprises a plurality of SAS-SSP frames, and wherein the LUT comprises an IO tag LUT.

28. The apparatus of claim 27, further including:
a plurality of lane protocol processors coupled to the lane number FIFO array, the protocol processors in association with the plurality of lane receive buffers, a first lane protocol processor to provide a second IO tag to the FIFO array, the second IO tag associated with a second frame appearing at the head of a lane receive buffer associated with the first lane protocol processor, the first lane protocol processor to process the second frame if a second lane number indexed from the FIFO array using the second IO tag matches a lane number corresponding to the lane receive buffer associated with the first lane protocol processor.

* * * * *

UNITED STATES PATENT AND TRADEMARK OFFICE
CERTIFICATE OF CORRECTION

PATENT NO. : 7,366,817 B2 Page 1 of 1
APPLICATION NO. : 11/171959
DATED : April 29, 2008
INVENTOR(S) : Chang et al.

It is certified that error appears in the above-identified patent and that said Letters Patent is hereby corrected as shown below:

In column 10, line 28, in Claim 27, delete "(SCSI" and insert -- (SCSI) --, therefor. (1st occurrence)

Signed and Sealed this

Twenty-ninth Day of July, 2008

JON W. DUDAS
*Director of the United States Patent and Trademark Office*